United States Patent [19]

Yaguchi et al.

[11] 3,955,881

[45] May 11, 1976

[54] ELECTRO-OPTICAL DEVICE EMPLOYING NEMATIC LIQUID CRYSTAL

[75] Inventors: Mashachika Yaguchi, Yokohama; Toshio Jinnai, Kamakura; Mikio Shirotsuka, Kamakura; Kazuo Totani, Kamakura, all of Japan

[73] Assignee: Dai Nippon Toryo Kabushiki Kaisha, Osaka, Japan

[22] Filed: July 1, 1974

[21] Appl. No.: 485,036

[30] Foreign Application Priority Data
June 10, 1974 Japan............................ 49-65071

[52] U.S. Cl. ........................................... 350/160 LC
[51] Int. Cl.² ............................................ G02F 1/13
[58] Field of Search ............................ 350/160 LC

[56] References Cited
UNITED STATES PATENTS

| | | | |
|---|---|---|---|
| 2,524,286 | 10/1950 | Dreyer | 350/160 LC UX |
| 3,853,391 | 12/1974 | Sorkin | 350/160 LC |
| 3,854,793 | 12/1974 | Kahn | 350/160 LC |
| 3,864,021 | 2/1975 | Katagiri et al. | 350/160 LC |

*Primary Examiner*—John K. Corbin
*Assistant Examiner*—Matthew W. Koren
*Attorney, Agent, or Firm*—Sughrue, Rothwell, Mion, Zinn & Macpeak

[57] ABSTRACT

In an electro-optical element comprising a pair of electrode plates and a layer of nematic liquid crystal material having a positive dielectric anisotropy positioned between the two plates, at least one of the electrode plates is coated on its inner face with organic high molecular materials. Molecular axes of the liquid crystal are oriented uniformly on the electrode face by rubbing the coated electrode along one direction.

10 Claims, No Drawings

ELECTRO-OPTICAL DEVICE EMPLOYING NEMATIC LIQUID CRYSTAL

BACKGROUND OF THE INVENTION

This invention relates to an electro-optical element employing nematic liquid crystal materials of a positive dielectric anisotropy.

It is known that nematic liquid crystals (hereinafter referred to as "N-liquid crystals") can be used for display, light modulation and the like by utilizing their specific property that optical characteristics are changed under application of electric fields, magnetic fields, ultrasonic waves and the like. Such elements comprise, in general, an N-liquid crystal filled and supported between two substrates disposed to confront each other with a distance smaller than about 50$\mu$, at least one of which is transparent, and the change in the molecular arrangement caused under application of electric fields, magnetic fields, ultrasonic waves and the like is utilized for light modulation.

Compounds forming such N-liquid crystal are divided into two types depending on the molecular structure and dielectric properties, one type being characterized in that the molecular axis and electric dipole are substantially vertical to each other (the liquid crystal of this type will hereinafter be referred to as "Nn-liquid crystal") and the other being characterized in that the molecular axis and electric dipole are substantially in parallel (the liquid crystal of this type will hereinafter be referred to as "Np-liquid crystal"). Accordingly, the Nn-liquid crystal indicates an N-liquid crystal having a negative dielectric anisotropy, and the Np-liquid crystal indicates an N-liquid crystal having a positive dielectric anisotropy.

The conventional Np-liquid crystal electro-optical elements comprises a pair of electrode plates disposed to confront each other and a Np-liquid crystal layer interposed between said plates. The molecular axes of the Np-liquid crystal are made parallel with the electrode faces and are arranged in the substantially same direction in a plane parallel to the electrode plate. If seen from the direction vertical to the electrode plate, molecular axes are arranged in the state continuously distorted from one another between adjacent faces. Such an orientation of the molecular axes is prepared by rubbing the electrode face along one direction with fabrics, paper or the like and piling the two rubbed electrodes in such a way that the rubbing directions are at right angles to each other. The molecular axes near by the electrode face are oriented along the rubbing direction while the molecular axes in the liquid crystal layer are oriented in the state continuously distorted. When polarized light passes through this liquid crystal layer, the polarization plane of the light is rotated depending on the degree of distortion of the molecular axis direction. This distortion of the molecular axis direction can be relaxed by application of an appropriate electric field. Accordingly, by adjusting the intensity of the electric field it is made possible to adjust rotation of the polarization plane of polarized light passing through the element.

When the Np-liquid crystal element is interposed between two polarizing plates, it changes from the light-shielding state to the light-transmitting state or from the light-transmitting state to the light-shielding state depending on the applied voltage, and this light modulation is utilized for display.

Since the light modulation process utilizing the Np-liquid crystal element provided between two polarizing plates disposed in such a way that the oscillation planes of light cross to each other exhibits a mechanism quite different from a Nn-liquid crystal electro-optical element, a higher contrast ratio can be obtained in use for display of a pattern. Further, the Np-liquid electro-optical element can be utilized for construction of a Boolean algebra generator, a logical product gate, a "nor" gate and a more complicated logical circuit. If an Np-liquid crystal electro-optical element capable of responding quickly is employed, it can be utilized for display of a three-dimensional television or moving picture. Further, in the case of the Np-liquid crystal electro-optical element, since the wavelength region of rays of transmission varies depending on the electric voltage when it changes within the range of the threshold value to the saturation voltage, it can be used for display of colors.

In the conventional Np-liquid crystal electro-optical elements, the process of rubbing the electrode face directly in one direction is employed for orientation of the liquid crystal molecules as mentioned hereinbefore. With this process, however, it is impossible to orient the liquid crystal molecules uniformly so that the display in the obtained element becomes nonuniform and can not exhibit the sufficient properties. By way of the example, in a light-modulation system where the element in which the rubbing directions are at right angles to each other is provided between two polarizing plates of which polarizing axes are parallel each other, it should shut off light to render the display black under no application of electric field, but as a matter of fact, the display appears dark grey because the element transmits more or less light due to nonuniform orientation of the liquid crystal molecules. Further, since a percent transmission in uneven in part, the display has the bright and dark parts mixed together. This becomes serious obstacle for practical uses.

Moreover, since the liquid crystal material comes into contact with the electrode face and therefore, electro-chemical reaction takes place at the inter-face so that the life of the element becomes short.

As for means for orientation of the Np-liquid crystal molecule, in addition to the process of rubbing the electrode face in one direction, the process of providing an alignment film on the electrode face is disclosed in U.S. Patent application Ser. No. 242,675 wherein platinum, gold, tin, lead, aluminum, copper, silver, silicon monoxide or chromium are applied on the electrode face in the form of an alignment film by an oblique incidence deposition. Also, U.S. Pat. No. 3,700,306 discloses the electrode film protected with a thin overcoat of sintered or fused glass or silicon oxide to prevent the electro-chemical reaction at the inter-face between the liquid crystal layer and the electrode face and accordingly, to prolong the life of the element.

SUMMARY OF THE INVENTION

An object of this invention is to provide a Np-liquid crystal element with uniform orientation of the Np-liquid crystal molecules on an electrode face.

A further object of this invention is to provide the Np-liquid crystal element with prolonged life.

A still further object of this invention is to provide the Np-liquid crystal element with reduced deviation of electro-optical properties among products in case of mass-production.

The foregoing objects can be attained with use of the element of which at least one electrode is coated on its interior face with a thin layer of a certain organic high molecular material or magnesium fluoride, the coated electrode face being rubbed along one direction by known means.

Particularly, in case the electrode is coated with nitrocellulose, acetylcellulose, cellulose acetate butyrate, cellulose acetate propionate or methylcellulose or mixture thereof, the element with good orientation of the liquid crystal molecules and excellent electro-optical properties can be obtained, and furthermore, deviation of electro-optical properties among products is remarkably decreased in case of mass-production.

DETAILED DESCRIPTION OF THE INVENTION

It was found that a Np-liquid crystal element of which the electrode plate is coated on its interior face with organic materials, particularly, a certain organic high molecular material and then rubbed with fabrics or paper along one direction is superior in orientation of the liquid crystal molecules and the life of the element to a Np-liquid crystal element in which the rubbing is conducted but no coating is applied.

Examples of the organic high molecular material which may be used include urea resins, melamine resins, phenolic resins, epoxy resins, acrylic resins, unsaturated polyester resins, alkyd resins, urethane resins, silicone resins, polyvinyl acetate, polystyrene, cellulose resins and polybutadiene. The prepolymers, oligomers, monomers or mixtures thereof may also be used for the coating materials.

The coating material is dissolved in suitable solvents, applied on the electrode plates according to the known processes, for example, by spray coating, dip coating, brush coating, electrostatic coating, electrodeposition, roller coating or dust coating, and then, dried naturally or by heating. Resin films may be also adhered to the electrode face under application of pressure and heat. Further, the monomer material may be coated on the electrode plate by vacuum discharge polymerization. The overcoat may be formed with use of a single coating material or its mixture and also, may be of single layer or laminated film. The thickness of the overcoat is not particularly critical, but in case of the thickness too large the resulting element is slow in responding. Preferably, the thickness of the overcoat is less than about $5\mu$, more preferably less than $1\mu$.

Of the organic high molecular materials the phenolic resins, acrylic resins and cellulose resins are particularly suitable for obtaining the element with good orientation of the liquid crystal molecules and a prolonged life as demonstrated in the following Examples. Among the cellulose resins particularly, the use of nitrocellulose, acetylcellulose, cellulose acetate butyrate, cellulose acetate propionate and methylcellulose and mixtures thereof renders the resulting elements excellent electro-optical properties as compared with the case of the other organic high molecular materials.

The term of "cellulose resin" is used hereinafter as including the five cellulose types specified above. The coating of the cellulose resin on the electrode is accomplished by dissolving the cellulose resin into a suitable solvent such as n-butyl acetate, acetone, methyl acetate, methyl ethyl ketone, methyl isobutyl ketone, butyl cellosolve and carbitol to form a solution having a cellulose resin concentration of 0.1 to 5% by weight, preferably 0.5 to 2% by weight, and then coating the solution on the electrode according to a customary coating method, for example, by dip coating, spray coating, brush coating, roller coating or the like. The coating is naturally dried or is dried by heating it at 40° to 80°C. The above-exemplified cellulose resins can be used singly or in the form of a mixture of two or more of them.

The electrode coated with the cellulose resin is then rubbed in one direction several times under application of a pressure of at least 1 $g/cm^2$ with a brush, paper or cloth. Especially good orientation can be attained in molecules of the liquid crystal when rubbing is conducted under application of a pressure of 5 to 100 $g/cm^2$, and in this case elements excellent in the contrast ratio can be obtained.

A pair of the so pre-treated electrode plates are disposed to confront each other with a distance kept constant by a spacer and Np-liquid crystal is injected into this space distance to form an element.

Table 1 shows data of the initiation voltage and saturation voltage measured with respect to elements having an electrode coated with the cellulose resin and elements having an electrode coated with an acrylic, melamine, epoxy or phenol resin. Elements used for the measurement were prepared in the following manner.

A resin was dissolved in a suitable solvent to form a solution having a resin concentration of 1.0 percent, and the solution was coated on a transparent electrode mounted glass according to the dip coating method. Drying of the overcoat was conducted at 100°C. for 10 minutes in the case of the cellulose resin, and in the case of the other resins drying was conducted under the prescribed curing temperature and time conditions. In each coating the thickness was adjusted to about $1\mu$. Then, the coated electrode face was rubbed with cotton cloth under application of a pressure of 10 $g/cm^2$ in the case of the cellulose resin or 30 $kg/cm^2$ in the case of the other resins. In each element, as the Np-liquid crystal material there was employed an Np-liquid crystal composition comprising 27% by weight of p-methoxybenzylidene-p'-n-butylaniline, 27% by weight of p-ethoxybenzylidene-p'-n-butylaniline, 26% by weight of p-ethoxybenzylidene-p'-n-heptylaniline, 10% by weight of p-cyanobenzylideneaniline and 10% by weight of p-cyanophenyl-p'-n-octyloxybenzoate, and the distance between the electrode faces was adjusted to $7 \pm 1.5$ $\mu$. With respect to each resin, one lot (100 sheets) of elements were prepared, and deviations of the initiation voltage and saturation voltage were examined among the elements. In Table 1, the degree of deviation of the voltage is expressed by the length of the arrow, and by the initiation voltage is meant an applied voltage at which 10% light transmission was obtained and by the saturation voltage is meant an applied voltage at which 90 percent light transmission was obtained.

Table 1

| Resins | Voltage (Vrms) Initiation Voltage (upper arrow) and Saturation Voltage (lower arrow) 2  4  6  8  10  12  14  16  18  20 |
|---|---|
| Nitrocellulose (HIG40 manufactured by Asahi Kasei) | ⇠⇢ ⇠⇢ |
| Acetylcellulose (LT-105 manufactured by Daicel) | ⇠⇢ ⇠——⇢ |
| Cellulose Acetate | |

Table 1-continued

| Resins | Voltage (Vrms)<br>Initiation Voltage (upper arrow) and Saturation Voltage (lower arrow)<br>2  4  6  8  10  12  14  16  18  20 |
|---|---|
| Butyrate (EAB-171-2 manufactured by Eastman Kodak) | ←→ (around 4) / ←→ (around 8) |
| Cellulose Acetate Propionate (ASP manufactured by Eastman Kodak) | ←→ (around 4) |
| Methylcellulose (65SH-4000 manufactured by Shinetsu Kagaku) | ←→ (around 4) / ←——→ (8–12) |
| Acrylic Resin (RE-377 manufactured by Mitsubishi Rayon) | ←———→ (6–12) |
| Melamine Resin (Delicon DE No. 500 manufactured by Dainippon Toryo) | ←———→ (8–14) |
| Epoxy Resin (AER No. 664 manufactured by Asahi Kasei) | ←———→ (10–16) / ←———→ (6–12) |
| Phenolic Resin (Beckosol manufactured by Dainippon Ink) | ←→ (6–10) / ←————→ (8–18) |

As is apparent from Table 1, in the elements having an electrode coated with the cellulose resin both the initiation voltage and saturation voltage are much lower than in the elements having an electrode coated with an acrylic, melamine, epoxy or phenol resin. In short, the former element is advantageous over the latter elements in that the actuation voltage is very low. From Table 1, it is also apparent that in the case of mass-production, deviations of the initiation voltage and saturation voltage are much smaller among the former elements than among the latter elements.

When the uniformity in the electro-optical response was visually examined with respect to each of the elements shown in Table 1, it was found that the element having an electrode coated with the cellulose resin exhibited a more uniform electro-optical response throughout the entire element than the other elements. Further, in the elements having an electrode coated with the cellulose resin shown in Table 1, there was observed no substantial difference of the actuation voltage in one element and it was found that the difference of the actuation voltage in one element was 1 percent or lower.

Table 2 illustrates data of the variation range of the maximum contrast ratio (percent transmission under no voltage/percent transmission under saturation voltage) determined with respect to elements prepared by coating an electrode with nitrocellulose and rubbing the nitrocellulose coat under application of pressure of 1 g/cm² to 1 kg/cm² and elements prepared by coating an electrode with an acrylic, melamine, epoxy or phenol resin and rubbing the coat under application of pressure of 10 kg/cm² to 50 kg/cm². In each of the elements shown in Table 2, the coating thickness, the Np-liquid crystal material composition and the distance between the electrode faces were the same as those of the elements shown in Table 1.

Table 2

| Resin | Maximum Contrast Ratio<br>10  20  30  40  50  60  70  80  90  100 |
|---|---|
| Nitrocellulose (HIG 40 manufactured by Asahi Kasei) | ←—————————————→ (30–100) |
| Acrylic Resin (RE-377 manufactured by Mitsubishi Rayon) | ←→ (around 20) |
| Melamine Resin (Delicon DE No. 500 manufactured by Dainippon Toryo) | ←→ (around 30) |
| Epoxy Resin (AER No. 664 manufactured by Asahi Kasei) | ←——→ (20–40) |
| Phenolic Resin (Beckosol manufactured by Dainippon Ink) | ←——→ (20–40) |

As is apparent from Table 2, the elements having an electrode coated with nitrocellulose have a much higher maximum contrast ratio than the other elements and they always have a maximum contrast ratio of at least 30 : 1. Further, it was found that when the nitrocellulose coating is rubbed under application of pressure of 5 to 100 g/cm², especially good contrast ratios ranging from 50 : 1 to 100 : 1 can be obtained. Similar results were obtained when acetylcellulose, cellulose acetate butyrate, cellulose acetate propionate and methyl cellulose were used instead of the nitrocellulose.

The electro-optical characteristics of the element is hardly influenced by the molecular weight (degree of polymerization) or degree of substitution of the cellulose resin used for coating the electrode. More specifically, even when cellulose resins differing in the molecular weight (degree of polymerization) and the degree of substitution are employed for coating electrode, there is observed no substantial differences of the electro-optical characteristics among the resulting elements. This feature will readily be understood from Table 3 illustrating data of the initiation voltage and saturation voltage measured with respect to elements prepared by employing nitrocellulose and cellulose acetate butyrate resins differing in the viscosity (a higher viscosity indicates a higher molecular weight) and the degree of substitution as an electrode coating material. In each of the elements shown in Table 3, the rubbing pressure, the coating thickness, the Np-liquid crystal material composition and the distance between the electrode faces were the same as those of the elements shown in Table 1.

Table 3

| | Viscosity (sec.) | Substitution Degree (%) | Initiation Voltage (V) | Saturation Voltage (V) |
|---|---|---|---|---|
| Nitrocellulose Resin | | | | |
| HIG 1/6 manufactured by Asahi Kasei | 1.0 – 1.5 | 11.5 – 12.2 | 4.4 | 6.3 |
| HIG 40 manufactured by Asahi Kasei | 40 | 11.5 – 12.2 | 4.3 | 6.6 |
| HIG 120 manufactured by Asahi Kasei | 110.0 – 140.0 | 11.5 – 12.2 | 4.3 | 7.0 |
| LIG 1/8 manufactured by Asahi Kasei | 20 – 29 | 10.7 – 11.4 | 4.2 | 6.2 |

Table 3-continued

| | Viscosity (sec.) | Substitution Degree (%) | | Initiation Voltage (V) | Saturation Voltage (V) |
|---|---|---|---|---|---|
| Cellulose Acetate Butyrate Resin | | Acetyl | Butyl | | |
| EAB-500-1 manufactured by Eastman Kodak | 0.8 – 1.2 | 5.0 | 49 | 4.4 | 12.4 |
| EAB-500-5 manufactured by Eastman Kodak | 4.0 – 6.0 | 5.0 | 49 | 4.6 | 11.3 |
| TSB manufactured by Eastman Kodak | 0.07 – 0.16 | 13.5 | 37 | 5.2 | 12.0 |
| HSB manufactured by Eastman Kodak | 0.3 – 0.5 | 13.5 | 37 | 5.2 | 11.8 |
| EAB-171-2 manufactured by Eastman Kodak | 1.5 – 3.0 | 29.5 | 17 | 4.4 | 10.6 |
| EAB-171-40 manufactured by Eastman Kodak | 31 – 40 | 29.5 | 17 | 4.2 | 10.0 |

As is apparent from Table 3, in each of nitrocellulose and cellulose acetate butyrate, there is brought about no substantial difference of the initiation and saturation voltages, namely the electro-optical characteristics, even when the molecular weight and the degree of saturation are changed. Also in the case of acetylcellulose, cellulose acetate propionate and methylcellulose, it was found that the electro-optical characteristics of the resulting elements were hardly influenced by the molecular weight and the degree of substitution.

Further, in the case of the element of this invention, the pressure to be applied at the rubbing treatment is remarkably decreased, and therefore, the rubbing treatment can be greatly facilitated. Accordingly, in the case of mass production, the deviation of the electro-optical characteristics can be highly reduced, and it is possible to prepare at low costs in large quantities the liquid crystal elements.

According to further embodiment of this invention, adhesion of the cellulose resin coat to the electrode face can be improved by providing between the cellulose resin and electrode layers a thermosetting organic high molecular substance layer having good adhesion to both the cellulose resin and electrode. Examples of such thermosetting substances include epoxy, phenolic urethane and acrylic resins, and the other conventional, thermosetting organic high molecular substances may be also used. The interposed thermosetting substance layer should not be of thickness too large in view of forming further the cellulose resin layer on said layer, and preferably, the thickness is less than about 1.0μ, more preferably the range of 0.1 to 0.5μ.

According to this invention, it was further found that elements prepared by coating the electrode with magnesium fluoride and rubbing the overcoat have the same effects as the case of the organic high molecular coating materials. Formation of the overcoat of magnesium fluoride may be effected according to the conventional thin-film formation of the inorganic material, for example by vacuum evaporation. The thickness of the overcoat may be less than about 1μ, preferably less than about 0.5μ.

This invention is illustrated by the following non-limitative examples.

EXAMPLE 1

A glass plate of 3 × 4 cm² provided with conductive layer of $SnO^2$ (referred to as glass electrode in the following Examples up to Example 14) was dipped into a 3.0 weight % solution of cyanoacrylate adhesive (Ep-1, Manufactured by TAOKA Chemical Co. Ltd) in acetone. Thus obtained overcoat was dried at room temperature, and then baked and dried in a dryer at 120°C for 30 minutes. The coated electrode was rubbed along one direction with fabrics under pressure of 10g/cm² and a pair of the so pre-treated electrode plates was positioned so that the rubbing directions are at right angles to each other, the two plates being margined by an insulating spacer of 4 μ in thickness. All of the apertures other than the opening for injecting of a liquid crystal material were sealed with an adhesive.

EXAMPLE 2

The glass electrode was dipped into a 1.0 weight % solution of phenolic resin (Beckosol) in ethylalcohol to apply the resion solution on the electrode face. The overcoat was dried at room temperature, and then baked and dried in a dryer at 200°C for 10 minutes. The coated electrode was rubbed along one direction with fabrics under pressure of 30 Kg/cm². The same cell as that of Example 1 with the exception of crossing the rubbing directions at the angle of 45° was formed.

EXAMPLE 3

The glass electrode was dipped into a 2.0 weight % solution of silicone resin (KE-45, Shinetsu Kagaku Co., Ltd Japan) in hexane to apply the resin solution on the electrode face. The overcoat was dried at room temperature, and then baked and dried in a dryer at 210°C for 10 minutes. The coated electrode was rubbed along one direction with fabrics under pressure of 30 Kg/cm². The same cell as that of Example 1 was formed, the rubbing directions being at right angles to each other.

EXAMPLE 4

Polyester film of 1μ in thickness (Lumirror, manufactured by Toray Co., Ltd.) was positioned on the glass electrode and adhered to the electrode face by pressure of 15 Kg/m² at 200°C. The treated electrode was rubbed along one direction with fabrics under pressure of 30 Kg/cm². The same cell as that of Example 1 was formed, the rubbing directions being at right angles to each other.

EXAMPLE 5

4.0 weight % of urea resin (Uloid, manufactured by Mitsui Toatsu Co., Ltd) were dissolved in an equiweight mixture of acetone and methanol (referred hereinafter to as mixed solvent). The resin solution was applied on the glass electrode by roller coating and dried at room temperature and then baked and dried in a dryer at 150°C for 20 minutes. The coated electrode was rubbed along one direction under pressure of 30 Kg/cm². The same cell as that of Example 1 was formed, the rubbing directions being crossed at the angle of 45°C.

EXAMPLE 6

The glass electrode was dipped into a 1.5 weight % solution of styrene resin (Stylit, Manufactured by Daido Kogyo Co., Ltd) in the mixed solvent. The overcoat was dried at room temperature and then, baked and dried in a drier at 180°C for 10 minutes. The coated electrode was rubbed along one direction with fabrics under pressure of Kg/cm². The same cell as that of Example 1 was formed, the rubbing directions being at right angles to each other.

7

A resin solution was applied on the glass electrode by dipping it into a 2.5 weight % solution of urethane resin (V-Chroma, manufactured by Dai Nippon Toryo Co., Ltd.) in the mixed solvent and dried at room temperature and then, baked and dried in a dryer at 150°C for 20 minutes. The treated electrode was rubbed along one direction with fabrics under pressure of 30 Kg/cm². The same cell as that of Example 1 was formed, the rubbing directions being at right angles to each other.

EXAMPLE 8

A 3.0 weight % solution of polyamide (Sumitherm 114, manufactured by Sumitomo Denko Co., Ltd.) in the mixed solvent was applied on the glass electrode by spray coating. The overoat was dried at room temperature and then baked and dried in a dryer at 200°C for 20 minutes. The coated electrode was rubbed along one direction with fabrics under pressure of 30 Kg/cm². The same cell as that of Example 1 was formed, the rubbing directions being at right angles to each other.

EXAMPLE 9

A resin solution was applied on the glass electrode by dipping it into a 3.5 weight % solution of vinyl acetate resin (Vinyon, manufactured by Nichia Paint Co., Ltd.) in the mixed solvent. The overcoat was dried at room temperature and thereafter, baked and dried in a dryer at 200°C for 10 minutes. The coated electrode was rubbed along one direction with fabrics under pressure of 1 Kg/cm². The same cell as that of Example 1 was formed, the rubbing directions being at right angles to each other.

EXAMPLE 10

A 4.0 weight % solution of melamine resin (Delicon, Manufactured by Dai Nippon Toryo K.K.) in the mixed solution was applied on the glass electrode by spray coating. The overcoat was dried at room temperature and thereafter, baked and dried in a dryer at 190°C for 15 minutes. The coated electrode was rubbed along one direction with fabrics under pressure of 30 Kg/cm². The same cell as that of Example 1 was formed, the rubbing directions being at right angles to each other.

EXAMPLE 11

The glass electrode was dipped into a 3 weight % solution of nitrocellulose resin (HIG 40, manufactured by Asahi Kasei Co., Ltd.) in n-butyl acetate. Thus obtained overcoat was dried at room temperature and then, baked and dried in a dryer at 100°C for 5 minutes. The coated electrode was rubbed along one direction with fabrics under pressure of 10 g/cm². The same cell as that of Example 1 was formed, the rubbing directions being at right angles to each other.

EXAMPLE 12

The glass electrode was dipped into a 3 weight % solution of casein in isopropyl alcohol. The overcoat on the electrode was dried at room temperature and then, baked and dried in a dryer at 120°C for 10 minutes. The coated electrode was rubbed along one direction with fabrics under pressure of 1 Kg/cm². The same cell as that of Example 1 was formed, the rubbing directions being at right angles to each other.

EXAMPLE 13

A resin solution was applied on the glass electrode by dipping it into a 3 weight % solution of a mixture of 90% by weight of 1.4 — addition polybutadiene (Polyoil Huls-1300, manufactured by Huls) and 10% by weight of peroxide catalyst in methanol. The obtained overcoat was dried at room temperature and then, baked in a dryer at 150°C for 20 minutes. The coated electrode was rubbed along one direction with fabrics under pressure of 30 Kg/cm². The same cell as that of Example 1 was formed, the rubbing directions being at right angles to each other.

EXAMPLE 14

The glass electrode was coated with magnesium fluoride ($MgF_2$)by vacuum deposition. The overcoat was of about $0.5\mu$ in thickness. The treated electrode was rubbed along one direction with fabrics under pressure of 1 Kg/cm². The same cell as that of Example 1 was formed, the rubbing directions being at right angles to each other.

A Np-liquid crystal composition consisting of 80% by weight of an equi-weight mixture of p-methoxybenzylidene-p'-butylaniline and p-ethoxybenzylidene-p'-butylaniline and 20% by weight of a compound represented by the formula,

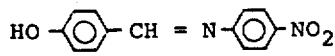

was injected into each cell of Examples 1 to 14 and the opening for injection was sealed with an adhesive. The liquid crystal electro-optic element obtained from the cell of Example 1 is referred to as Specimen 1 and the same applies correspondingly to Specimens 2–14. A blank element was formed by preparing the same cell as that of Example 1 except use of a non-coated electrode, injecting the above-mentioned Np-liquid crystal composition and sealing the cell.

Table 4 shows characteristics of a light modulation apparatus where each element of Specimens 1–14 and the blank element were positioned between two polarizing plates.

Table 4

| Specimen No. | Crossing of Polarizing plates[*1] | Threshold Voltage Saturation Voltage Vo-p [*2] | Brightness of Display and Colour Changes | Temperature[*3] cycle Test Cycle Numbers | Current[*4] Test, Hours | N-I$_{pt}$ °C[*5] Initial | N-I$_{pt}$ °C[*5] After 500 hrs. | Current Density[*6] μA/cm² Initial | Current Density[*6] μA/cm² After 500 hrs. |
|---|---|---|---|---|---|---|---|---|---|
| 1 | = | 2.5 – 5.5 | Wholly uniform brightness (Black → White) | Over 20 times | >1500 | 61.0 | 59.1 | 0.93 | 1.2 |
| 2 | = | 2.8 – 6.1 | Wholly uniform brightness (White → Red → Yellow → Green → Blue) | Over 20 times | >1500 | 61.0 | 59.3 | 0.98 | 1.1 |
| 3 | ⊥ | 2.6 – 5.4 | Wholly uniform brightness (White → Black) | 15 times | >900 | 61.0 | 58.2 | 1.00 | 2.5 |
| 4 | = | 5.2 – 9.5 | Wholly uniform brightness (Black → White) | 13 times | >900 | 59.5 | 58.8 | 0.91 | 1.9 |
| 5 | = | 2.5 – 5.5 | Wholly uniform brightness (White → Red → Yellow → Green → Blue) | 15 times | >900 | 61.0 | 57.4 | 0.93 | 2.0 |
| 6 | ⊥ | 2.1 – 5.8 | Wholly uniform brightness (White → Black) | 14 times | >900 | 61.0 | 59.0 | 1.00 | 2.3 |
| 7 | = | 2.3 – 5.9 | Wholly uniform brightness (Black → White) | 9 times | >900 | 59.8 | 58.2 | 0.90 | 2.9 |
| 8 | = | 2.6 – 6.1 | ditto | 10 times | >900 | 59.2 | 58.1 | 0.90 | 3.5 |
| 9 | = | 2.4 – 5.4 | ditto | 11 times | >900 | 60.0 | 58.3 | 1.00 | 2.0 |
| 10 | = | 2.3 – 8.2 | ditto | 19 times | >900 | 60.0 | 57.9 | 1.10 | 1.9 |
| 11 | = | 2.2 – 5.3 | Wholly uniform brightness (Black → White) | Over 20 times | >1500 | 59.9 | 59.8 | 0.91 | 1.3 |
| 12 | = | 2.3 – 6.1 | ditto | 15 times | >900 | 59.8 | 58.4 | 1.00 | 3.5 |
| 13 | = | 2.8 – 7.1 | ditto | 13 times | >900 | 61.0 | 58.6 | 0.90 | 2.8 |
| 14 | = | 3.1 – 6.5 | ditto | 15 times | >900 | 61.0 | 59.1 | 0.90 | 1.9 |
| Blank Element | = | 2.9 – 8.9 | Uneven in brightness (Black → White) | 2 times | <100 | 61.0 | 57.3 | 1.30 | 7.4 |

[*1] ⊥: Oscillation planes of light are at right angles to each other.
=: Oscillation planes of light are in parallel to each other.
[*2] Threshold and saturation values in case elements were visually observed. The actual saturation voltage (for example, in case a percent light-transmission of 90% was attained in the colour change of from black to white) is higher than the observed value.
[*3] One cycle includes allowing elements to stand at −20°C for 14 hrs. and at 70°C for 10 hrs. with no field applied. Numbers of the cycle till the contrast ratio has reached a value less than 50% relative to that before test. The fact that numbers of the cycle are large shows an improved stability of orientation.
[*4] Time (hrs.) till 5 Vrms for 50Hz are continuously applied at 50°C and the contrast ratio reaches a value of less than 50% relative to that before application of the field. A long time shows an improved stability of orientation.
[*5] 5 Vrms for 50 Hz were continuously applied at 25°C for 500 hours. N-Ipt (Nematic-Isotropic transition temperature) of Np-liquid crystal composition at the initial application and after lapse of 500 hours. If any electro-chemical reaction takes place at the interface between the liquid crystal material and electrode layers, the N-Ipt would be reduced due to decomposition of the liquid crystal material. Accordingly, elements exhibiting a large decrease in the N-Ipt after 500 hours show that the electro-chemical reaction proceeds rapidly and therefore, the life of the element becomes short. The liquid crystal composition used in the Examples has a mesomorphic range of −15°< 61°C.
[*6] Current density per 1 cm² through an element at the initial application and after 500 hours. The application conditions are the same as in *5. If the electro-chemical reaction takes place at the interface between the liquid crystal and electrode layers, the current density becomes large. Accordingly, elements exhibiting a large increase in the current density after 500 hours show that the electro-chemical reaction proceeds rapidly and therefore, the life of the element becomes short.

EXAMPLE 15

In$_2$O$_3$ was coated by vacuum evaporation on a square sheet of hard glass of a size of 5 cm × 5 cm so that the surface resistivity of 500 Ω·cm² was attained, to thereby form a transparent electrode plate having a percent transmission of 89 percent. Then, a 1.0% by weight solution of nitrocellulose (HIG-40 manufactured by Asahi Kasei) in n-butyl acetate was brush-coated on the electrode face and dried at 100°C. for 10 minutes. The thickness of the so formed nitrocellulose coat was about 1 μ. Six pairs of the so formed electrode plates having an electrode face coated with nitrocellulose were prepared, and they were rubbed three times along one direction under application of pressures of 1 g/cm², 5 g/cm², 25 g/cm², 125 g/cm², 250 g/cm²· and 1 Kg/cm², respectively. Then, 6 pairs of the so rubbed electrode plates were formed into 6 liquid crystal elements by employing as a Np-liquid crystal material a composition comprising 27% by weight of p-methoxybenzylidene-p'-n-butylaniline, 27% by weight of p-ethoxybenzylidene-p'-n-butylaniline, 26% by weight of p-ethoxybenzyldene-p'-n-heptylaniline, 10% by weight of p-cyanobenzylidene-aniline and 10% by weight of p-cyanophenyl -p'-octyloxybenzoate. In each element, the distance between the electrode faces was adjusted to 7 ± 1.5 μ. Each element exhibited a completely uniform electro-optical response throughout the entire element. These elements has an initiation voltage of about 4.3 V and a saturation voltage of about 6.5 V.

Each of these elements had a maximum contrast ratio of at least 30 : 1. Especially, the elements obtained by conducting the rubbing under 5 g/cm² and 25 g/cm² had a maximum contrast ratio of 80 : 1.

EXAMPLE 16

In$_2$O$_3$ was coated by vacuum evaporation on a square sheet of hard glass having a size of 5 cm × 5 cm so that the surface resistivity of 1 KΩ·cm² was attained, to thereby form a transparent electrode having a percent transmission of 90%. Four pairs of the so formed electrode plates were prepared. The electrode faces were coated according to the dip coating method by employing a 1.0% by weight solution of acetylcellulose (LT-105, manufactured by Daicel), cellulose acetate butyrate (EAB-171-2, manufactured by Eastman Kodak), cellulose acetate propionate (ASP, manufactured by Eastman Kodak) or methylcellulose (65 SH-4000, manufactured by Shinetsu Kagaku) in n-butyl acetate, and the coat was dried at 100°C. for 10 minutes. In each pair, the thickness of the coat was about 1μ. Then, the electrode faces were rubbed three times in one direction under a pressure of 50 g/cm². Thus, 4 liquid crystal elements were prepared by employing 4 pairs of the so rubbed electrodes, differing in the electrode face-coating material. The same Np-liquid crystal composition as used in Example 1 was employed, and the distance between the electrode was the same as in Example 1. Each of the so obtained elements exhibited a completely uniform electro optical response throughout the entire element. The initiation voltage, saturation voltage, and maximum contrast ratio of the so prepared elements are shown in table 5.

Table 5

| Resin | Initiation Voltage (V) | Saturation Voltage (V) | Maximum Contrast Ratio |
|---|---|---|---|
| Acetylcellulose | 5.2 | 12.0 | 50 : 1 |
| Cellulose acetate butyrate | 4.4 | 10.6 | 60 : 1 |
| Cellulose acetate propionate | 5.0 | 9.6 | 45 : 1 |
| Methylcellulose | 4.6 | 8.6 | 65 : 1 |

EXAMPLE 17

$In_2O_3$ was coated by vacuum evaporation on a square sheet of hard glass of a size of 5 cm × 5 cm so that the surface resistivity of 1 KΩ·cm$^2$ was attained, to thereby form a transparent electrode. A 0.3 weight % solution of phenolic resin (Beckosol, manufactured by Dainippon Ink Co., Ltd.) in acetone was applied on the electrode face by brush-coating and then, dried and cured at 200°C for 30 minutes. The thickness of the overcoat was about 0.3μ. Further, a 1.0 weight % solution of nitrocellulose (HIG 40, manufactured by Asahi Kasei Co., Ltd.) in n-butyl acetate was applied over the phenolic resin coat by brush-coating and then, dried at 100°C for 10 minutes. The phenolic resin and nitrocellulose layers had a thickness of about 1.3 μ in total.

The overcoat on the electrode was rubbed three times along one direction under pressure of 10 g/cm$^2$. Ten liquid crystal elements were made from 20 sheets of the so treated electrode. The used Np-liquid crystal material and distance between electrode faces of each cell were the same as in Example 15. All of the ten elements exhibited a completely uniform electro-optical response throughout the entire element. These elements had an initiation voltage of about 4.5 Vrms and a saturation voltage of about 6.5 Vrms, there being observed little difference from the case of Example 15.

Further, 10 pieces of elements of this example and 10 pieces of elements of Example 15 were subject to a temperature cycle test (One cycle : Allowing elements to stand at −20°C for 10 hours and at 70°C for 14 hours). In case of Example 15, 8 pieces of the 10 pieces brought about peeling of the overcoat off the electrode face after 20 cycles and thus, blowholes generated in the element. On the contrary, in case of this example, there was observed no generation of blowholes in all of the elements after 20 cycles.

With use of a 0.3 weight % solution of urethane resin (V-chroma, Dai Nippon Toryo) in methyl ethyl ketone or a 0.3 weight % solution of a mixture of 90 weight % of epoxy resin (AER No. 664, Asahi Kasei) and 10 weight % of tri (dimethylamino methyl) phenol - tri -2-ethylhexate as a curing agent in butylcellosolve instead of the above-mentioned 0.1 weight % solution of phenolic resin in acetone, the same effects as in this example were attained.

What is claimed is:

1. A liquid crystal electro-optical element which comprises a pair of electrode plates confronting each other and a thin layer of nematic liquid crystal materials having a positive dielectric anisotropy positioned between the two plates, at least one of the electrode plates being coated on its interior face with a thin layer of cellulose resins selected from the group consisting of nitrocellulose, acetylcellulose, cellulose acetate butyrate, cellulose acetate propionate, methylcellulose, and mixtures thereof, said coated face being rubbed along one direction.

2. A liquid crystal electro-optical element of claim 1 wherein the cellulose resin is nitrocellulose.

3. A liquid crystal electro-optical element of claim 1 wherein the cellulose resin is acetylcellulose.

4. A liquid crystal electro-optical element of claim 1 wherein the cellulose resin is cellulose acetate butyrate.

5. A liquid crystal electro-optical element of claim 1 wherein the cellulose resin is cellulose acetate propionate.

6. A liquid crystal electro-optical element of claim 1 wherein the cellulose resin is methylcellulose.

7. A liquid crystal electro-optical element of claim 1 wherein the layer of the cellulose resin has a thickness of less than about 5 μ.

8. A liquid crystal electro-optical element of claim 1 wherein the layer of the cellulose resin has a thickness of about 1.0 μ.

9. A liquid crystal electro-optical element of claim 1 wherein a thin layer of a thermo setting resin is further applied between the cellulose resin layer and the interior face of the electrode plate.

10. A liquid crystal electro-optical element of claim 9 wherein said thermo setting resin is a thermo setting type of organic high molecular materials selected from the group consisting of epoxy, phenolic, urethane and acrylic resins.

* * * * *